United States Patent
Badr et al.

(10) Patent No.: US 10,152,521 B2
(45) Date of Patent: Dec. 11, 2018

(54) RESOURCE RECOMMENDATIONS FOR A DISPLAYED RESOURCE

(71) Applicant: Google LLC, Mountain View, CA (US)

(72) Inventors: Ibrahim Badr, Brookline, MA (US); Gokhan H. Bakir, Zurich (CH); Michal Jastrzebski, Zurich (CH); Mugurel Ionut Andreica, Adliswil (CH)

(73) Assignee: Google LLC, Mountain View, CA (US)

( * ) Notice: Subject to any disclaimer, the term of this patent is extended or adjusted under 35 U.S.C. 154(b) by 187 days.

(21) Appl. No.: 15/189,523

(22) Filed: Jun. 22, 2016

(65) Prior Publication Data

US 2017/0371877 A1    Dec. 28, 2017

(51) Int. Cl.
G06F 17/30    (2006.01)
G06F 3/0482    (2013.01)

(52) U.S. Cl.
CPC ........ *G06F 17/3053* (2013.01); *G06F 3/0482* (2013.01); *G06F 17/30528* (2013.01); *G06F 17/30554* (2013.01); *G06F 17/30867* (2013.01)

(58) Field of Classification Search
CPC . G06F 17/3053; G06F 17/30528; G06F 17/30
USPC .................................................. 707/600–899
See application file for complete search history.

(56) References Cited

U.S. PATENT DOCUMENTS

| | | |
|---|---|---|
| 7,389,181 B2 | 6/2008 | Meadow |
| 7,689,613 B2 | 3/2010 | Candelore |
| 7,788,266 B2 | 8/2010 | Venkataraman |
| 8,316,019 B1 | 11/2012 | Ainslie et al. |
| 8,321,406 B2 | 11/2012 | Garg et al. |
| 8,391,618 B1 | 3/2013 | Chuang |
| 8,392,435 B1 | 3/2013 | Yamauchi |
| 8,515,185 B2 | 8/2013 | Lee |
| 8,521,764 B2 | 8/2013 | Pfleger |

(Continued)

FOREIGN PATENT DOCUMENTS

WO    2016/061102    4/2015

OTHER PUBLICATIONS

U.S. Appl. No. 13/069,978, filed Mar. 23, 2011, Taubman et al.

(Continued)

*Primary Examiner* — Isaac M Woo
(74) *Attorney, Agent, or Firm* — Fish & Richardson P.C.

(57) ABSTRACT

Methods, systems, and apparatus, including computer programs encoded on a computer storage medium, for providing contextual information to a user. In one aspect, a method includes receiving, from a user device, a query-independent request for contextual information relevant to an active resource displayed in an application environment on the user device, determining content described by the active resource in response to the query independent request, and identifying, in response to the query-independent request, multiple resources that are relevant to the content described by the active resource. Additional actions include, for each resource of the multiple resources, determining a corresponding measure of user engagement that reflects engagement of the resource by one or more users, selecting one or more of the multiple resources based on the measures of user engagement for the multiple resources, and providing, to the user device, a user interface element for display with the active resource.

20 Claims, 5 Drawing Sheets

(56) References Cited

U.S. PATENT DOCUMENTS

| | | |
|---|---|---|
| 8,606,781 B2 | 12/2013 | Chi et al. |
| 8,898,095 B2 | 11/2014 | Agrawal |
| 9,436,764 B2 * | 9/2016 | Ray .................. G06F 17/30864 |
| 2001/0053968 A1 | 12/2001 | Galitsky |
| 2007/0060114 A1 | 3/2007 | Ramer et al. |
| 2007/0071320 A1 | 3/2007 | Yada |
| 2007/0140595 A1 | 6/2007 | Taylor |
| 2007/0214131 A1 | 9/2007 | Cucerzan |
| 2008/0046405 A1 | 2/2008 | Olds et al. |
| 2008/0270110 A1 | 10/2008 | Yurick |
| 2010/0306249 A1 | 12/2010 | Hill |
| 2011/0035406 A1 | 2/2011 | Petrou et al. |
| 2011/0038512 A1 | 2/2011 | Petrou et al. |
| 2011/0125735 A1 | 5/2011 | Petrou |
| 2011/0128288 A1 | 6/2011 | Petrou et al. |
| 2011/0131241 A1 | 6/2011 | Petrou et al. |
| 2011/0137895 A1 | 6/2011 | Petrou et al. |
| 2011/0213655 A1 | 9/2011 | Assaf et al. |
| 2012/0109858 A1 | 5/2012 | Makadia et al. |
| 2012/0191745 A1 | 7/2012 | Velipasaoglu et al. |
| 2012/0215533 A1 | 8/2012 | Aravamudan et al. |
| 2013/0132361 A1 | 5/2013 | Chen et al. |
| 2013/0346400 A1 | 12/2013 | Ramsey et al. |
| 2014/0046935 A1 | 2/2014 | Bengio et al. |
| 2014/0143243 A1 | 5/2014 | Yookyung et al. |
| 2014/0172881 A1 | 6/2014 | Petrou et al. |
| 2015/0058318 A1 | 2/2015 | Blackwell |

OTHER PUBLICATIONS

U.S. Appl. No. 13/906,889, filed May 31, 2013, Heiler et al.

"10 Mobile Astronomy Apps for Stargazers," [online][Retrieved on Apr. 29, 2014]; Retrieved from the Internet URL: http://mashable.com/2011/06/21/astronomy-mobile-apps/, 2011, 13 pages.

"Google announces Search by Image and Voice Search for desktop, revamped mobile search," [online] Jun. 14, 2011 [Retrieved on Mar. 22, 2017] Retrieved from the Internet URL: https://www.engadget.com/2011/06/14/google-announces-search-by-image-search-by-voice-for-desktop/> 1 page.

"Google's Impressive "Conversational Search" Goes Live on Chrome," [online] [Retrieved on May 5, 2014]; Retrieved from the Internet URL: http://searchengineland.com/googles/impressive-conversational-search-goes-line-on-chrome-160445, 2013, 12 pages.

Zhang et al., "Probabilistic Query Rewriting for Efficient and Effective Keyword Search on Graph Data," Proceedings of the VLDB Endowment 6(14):1642-1653, 2013, 12 pages.

U.S. Appl. No. 14/313,519, filed Jun. 24, 2014, Bakir et al.

International Search Report and Written Opinion in International Application No. PCT/US2016/064633, dated Mar. 28, 2017, 12 pages.

Written Opinion issued in International Application No. PCT/US2016/064633, dated May 22, 2018, 6 pages.

International Preliminary Report on Patentability issued in International Application No. PCT/US2016/064633, dated Oct. 1, 2018, 19 pages.

* cited by examiner

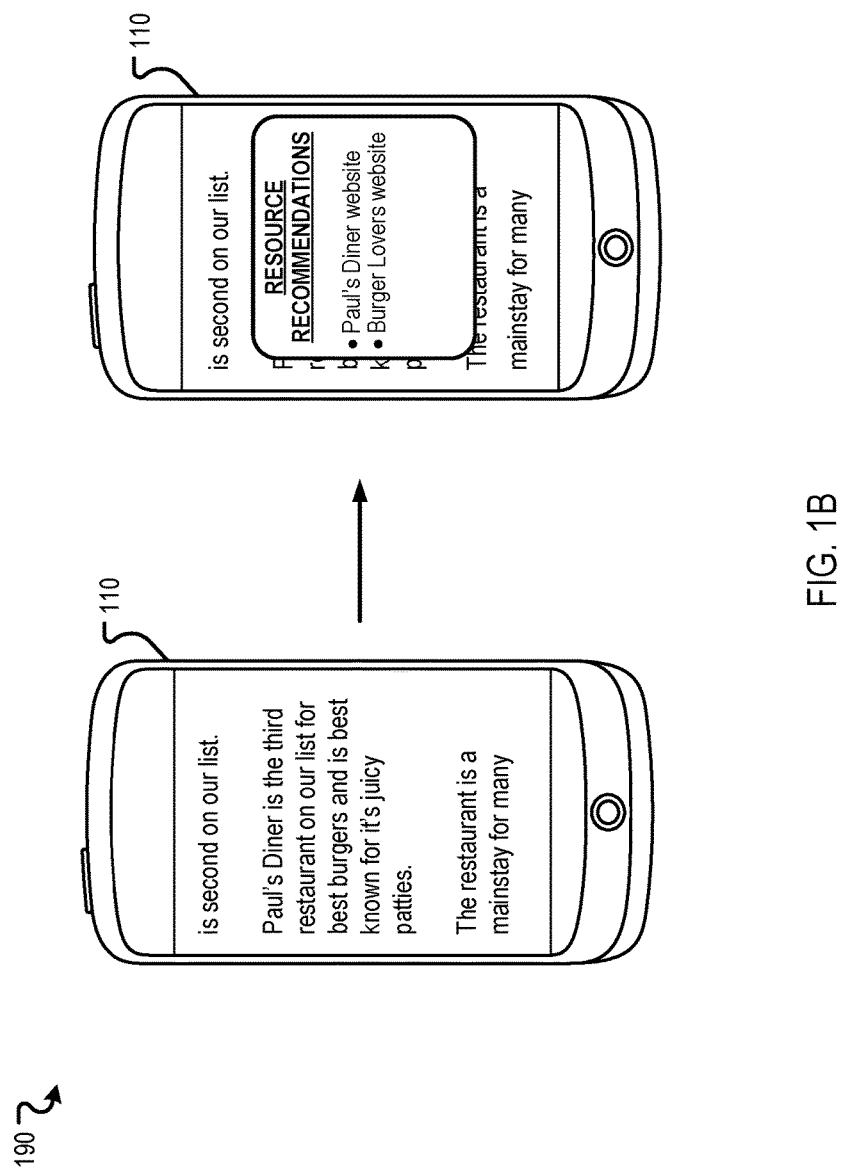

RESOURCE RECOMMENDATIONS FOR A DISPLAYED RESOURCE

BACKGROUND

This specification relates to providing contextual information to a user.

A device may provide a user with contextual information. For example, a device may display a web page about a particular subject, receive a search query from the user including search terms for the particular subject, retrieve search results responsive to the search query, and provide the search results to the user.

Typical interaction models require users to provide some form of a user query to a user device. For example, a user may be viewing article about a particular piece of sporting equipment on a smart phone and state "show me reviews about this item." A search process then analyzes the article, and the query which is dependent on the article, to determine search parameters and execute a search of resources to identify resources that may satisfy the user's informational needs.

SUMMARY

In general, one innovative aspect of the subject matter described in this specification can be embodied in methods that include the actions of receiving, from a user device, a query-independent request for contextual information relevant to an active resource displayed in an application environment on the user device, determining content described by the active resource in response to the query independent request, and identifying, in response to the query-independent request, multiple resources that are relevant to the content described by the active resource. Additional actions include, for each resource of the multiple resources, determining a corresponding measure of user engagement that reflects engagement of the resource by one or more users, selecting one or more of the multiple resources based on the measures of user engagement for the multiple resources, and providing, to the user device, a user interface element for display with the active resource. The user interface element includes navigation links for each of the selected multiple resources that, upon selection, causes the user device to request the respective resource.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In certain aspects, receiving, from a user device, a query-independent request for contextual information relevant to an active resource displayed in an application environment on the user device includes receiving, from the user device, a query-independent request that does not include one or more query terms entered by a user. In some aspects, identifying, in response to the query-independent request, multiple resources that are relevant to the content described by the active resource includes identifying multiple search items from the content described by the active resource and identifying multiple resources that are relevant to the multiple search items as the multiple resources that are relevant to the active resource. In some implementations, identifying, in response to the query-independent request, multiple resources that are relevant to the content described by the active resource includes identifying multiple resources that are frequently viewed by users who view the active resource as the multiple resources that are relevant to the active resource. In certain aspects, identifying, in response to the query-independent request, multiple resources that are relevant to the content described by the active resource includes determining a source of the active resource and selecting one or more of the multiple resources based at least on the measures of user engagement, measures of relevance of the multiple resources to search items identified from the content in the active resource, and the source of the active resource.

In some aspects, for each resource of the multiple resources, determining a corresponding measure of user engagement that reflects engagement of the resource by one or more users includes determining the corresponding measure of user engagement based on a number times that the resource is requested. In some implementations, selecting one or more of the multiple resources based on the measures of user engagement for the multiple resources includes selecting one or more of the multiple resources based at least on the measures of user engagement and relevance scores of the multiple resources identified from content in the active resource. In certain aspects, the resource includes one or more of a web page, an application page, or a textual conversation.

Particular embodiments of the subject matter described in this specification can be implemented so as to realize one or more of the following advantages. Contextual information that is likely to satisfy a user's informational need may be provided by a device to a user without the user providing a query to the device. The contextual information may be in the form of recommendations of other resources that may satisfy the user's information need. These recommendations may be referred to as resource recommendations and may be in the form of navigation links to the other resources. This results in a convenient way for the user to obtain resource recommendations based on a resource displayed on the device.

In particular, the system enables the input of a query-independent request for contextual information that is relevant to an active resource displayed on the user device in a fluid and intuitive manner. The user no longer needs to type in query terms or speak query terms to obtain contextual information. Accordingly, users are more likely to solicit contextual information as doing so can be accomplished in a manner that is not only convenient for the user, but also in a relatively discrete manner so that bystanders are not disturbed by the user speaking into the device. Also, because the user need not type in a query, the user may, in some implementations, solicit the information when the user would otherwise be unable to type effectively, e.g., when the user only has one hand free.

Also, because the input of the query-independent request for contextual information does not require a query input, the system does not need to perform text-to-speech processing or process typing input. This results in fewer input errors and erroneously input queries. Accordingly, when considered in the aggregate, thousands of erroneous and inaccurate queries are avoided, which in turn, provides a more efficient use of search system resources. In other words, multiple erroneous query processing cycles are avoided, which reduces processing resources required and reduces overall system bandwidth requirements (or, alternatively, enables a larger number of users to be serviced without a commensurate increase in processing resources). This improved in the technological field of search processing is thus another distinct advantage realized by the systems and methods described below.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A and 1B are block diagrams of example environments in which contextual information is provided for a displayed resource.

Like reference numbers and designations in the various drawings indicate like elements.

DETAILED DESCRIPTION

Sometimes a user may desire to receive additional information regarding the subject matter of a resource that the user is currently viewing on a device. For example, a user may be viewing a web page about burger places that mentions "Paul's Diner" and may desire to obtain additional information about "Paul's Diner." The user may open a web page for a search engine, type in "Paul's Diner" as a search query, scroll through a search results listing, and then select a search result to view. However, this process may be time consuming and require multiple interactions by the user.

Described below are systems and methods for providing contextual information for a displayed resource. Instead of providing contextual information based on a query entered by a user, the system may provide contextual information for a displayed resource and independent of a query input. To provide the contextual information, the system may detect that a user desires contextual information. For example, a user viewing a webpage about highly rated burger places that mentions "Paul's Diner" may press a button for three seconds, or provide some other indication like pressing a dedicated button or performing a particular gesture, to indicate that the user wishes to receive contextual information based on the displayed webpage. The system may detect the indication and, in response, identify search items from the text in the displayed resource and then provide contextual information about the identified search items to the user. For example, the system may identify that the text "Paul's Diner" that appears in the resource matches with a restaurant named "Paul's Diner," and in response, identify web pages about the restaurant "Paul's Diner" and then provide navigation links to the web pages about the restaurant "Paul's Diner."

In the case of resources that are to be identified to the user, the system advantageously considers user engagement with each resource. Examples of user engagement include tread measures as identified by search logs for which the resources have high selection rates relative to other resources. Another example is co-viewed resources, such as co-watched images and videos, or co-reach articles. Given the unique interactions that users have on mobile devices, and given that the request for the resources is query-independent, user engagement can be used as a significant signal of user interest. Identifying resources that a user may desire to view may be different from providing general information about search items identified from the resource or providing suggested actions for search items identified from the resource items in that providing general information or suggesting actions may not include providing or suggesting particular resources for the user to view.

These features and additional features are described in more detail below.

Figure 1A:
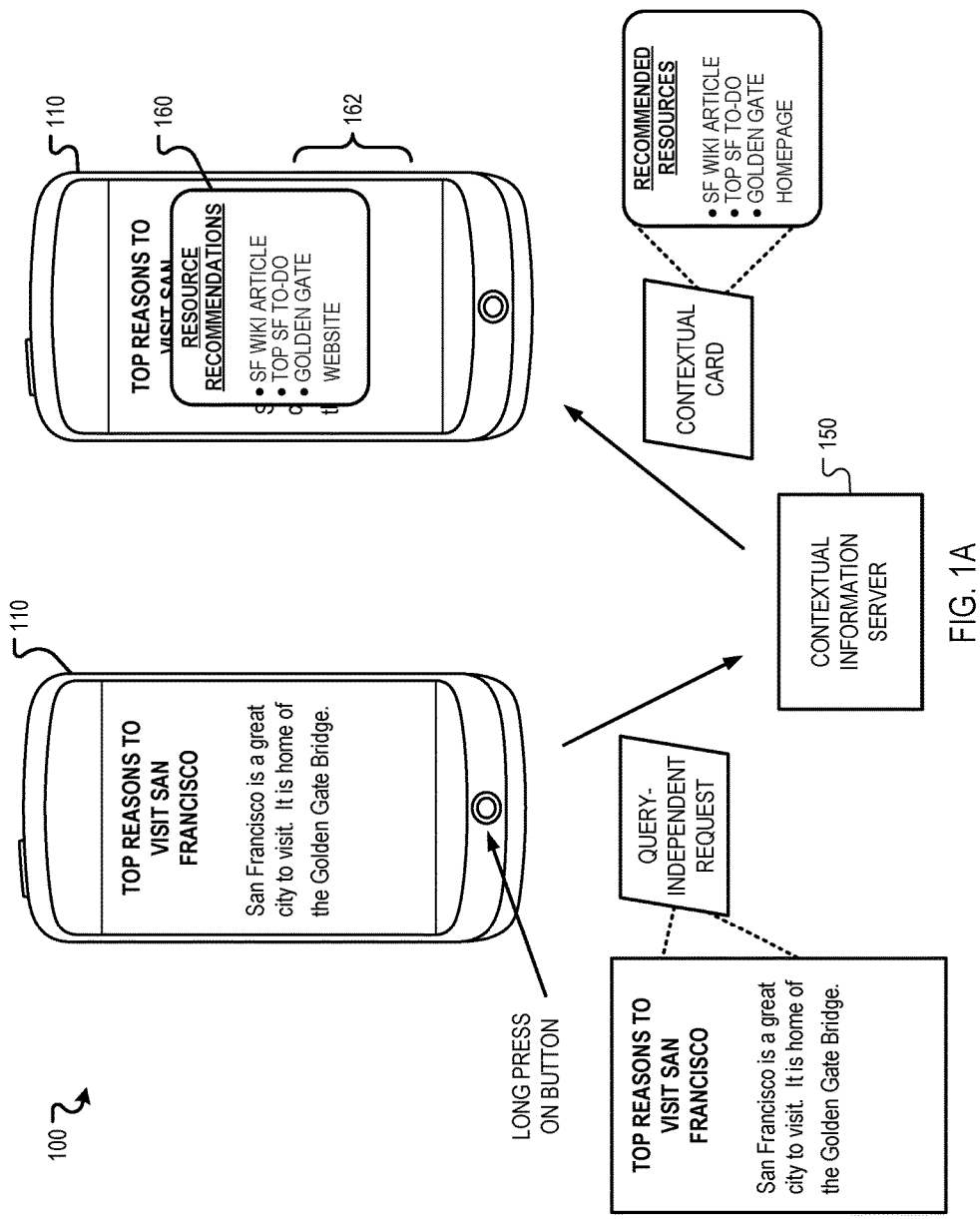

FIG. 1A is a block diagram of an example environment 100 in which contextual information is provided for a displayed resource. The environment 100 includes a user device 110 and a contextual information server 150.

A user device 110 is used by a user to obtain contextual information for a displayed resource. The user device 110 is an electronic device that is capable of requesting and receiving resources over the network. Example user devices 110 include personal computers (e.g., desktops or laptops), mobile communication devices (e.g., smart phones or tablets), and other devices that can send and receive data over the network (e.g., televisions, and glasses or watches with network communication functionality). A user device typically includes a user application, e.g., a web browser, to facilitate the sending and receiving of data over the network. The web browser can enable a user to display and interact with text, images, videos, music and other information typically located on a web page at a website on the World Wide Web or a local area network. The user device 110 may use any appropriate application to send and receive data over the network and present requested resources to a user.

A resource is data that includes content that can be visibly rendered by the user device 110. For example, resources may include HTML pages, electronic documents, images files, video files, text message conversations, e-mails, graphical user interfaces of applications, etc. An active resource may be considered a resource that is currently being displayed on the user device 110. Typically, the active resource is rendered by an application that is running in a foreground of a user device.

The user device 110 detects that a user desires contextual information for a displayed resource. For example, the user device 110 may be displaying a resource hosted by a web site, where the resource describes reasons for visiting San Francisco. The user may generate an indication for contextual information, e.g., by pressing a button for three seconds or tapping the screen according to a predefined tap patter, etc. Assume for illustrative purposes the user performs a long press that indicates that the user desires contextual information for a displayed resource. In response, the user device 110 provides a request to the contextual information server 150 for contextual information for the displayed resource. For example, the user device 110 may provide a request that includes a screenshot of the currently displayed portion of the active resource, where the portion includes the text "San Francisco," or the text of the active resource, the URI of the resources, etc.

The request may be considered a query-independent request as the user device 110 provides the request to the contextual information server 150 without having the user enter terms for a query, whether verbally, physically, or some other interaction. For example, after the user device 110 detects that a user has long pressed a button, the user device 110 may provide the request to the contextual information server 150 without requesting additional information from the user.

In response to providing the request to the contextual information server 150, the user device 110 then receives a user interface element from the contextual information server 150. The user interface element may include navigation links for one or more recommended resources identified based on the request. For example, the user device 110 may receive a user interface element that includes the text "Recommended Resources" and navigation links for webpages of "SF Wiki Article," "Top SF To-Do," and "Golden Gate Homepage." The navigation links may be selectable and upon selection, may cause the user device 110 to request the respective resource and then display the resource. The navigation link may be in the form of a title for the resource, a thumbnail of the resource, or some other representation of the resource. In some implementations, the user interface element may display a portion of recommendations. For example, the user interface element may include a carousel of navigation links where only one, two, or some other number of navigation links for recommended resources are shown at a time. In other implementations, the user interface element may display all recommendations at once. For example, the user interface element may include a list of all the navigation links.

For the purposes of illustration, the user interface element is described as a card. However, other user interface elements may be used, for example, chat bubbles, selectable linked notes or footnotes, synthesized voice responses, or other forms. In some implementations, instead of a single user interface element that includes multiple navigation links, a user interface element may include a single navigation link and multiple user interface elements may be received for different resources.

The user device 110 displays the received contextual card to the user. For example, the user device 110 may generate a graphical panel 160 that is shown overlaid on top of the displayed resource where the graphical panel 160 includes navigation links for recommended resources from the card. In another example, the user device 110 may stop displaying the resource and instead display the graphical panel 160. The user device 110 may enable the user to quickly return to the displayed resource. For example, the user device 110 may stop displaying the graphical panel 160 in response to detecting that a user has interacted with, e.g., clicked or touched, a portion of the resource that is not overlaid by the graphical panel 160. In another example, the user device 110 may stop displaying the graphical panel 160 and display the resource in response to detecting that a user has interacted with, e.g., clicked or touched, a selectable option for closing the graphical panel 160.

FIG. 1B is a block diagram of an example environment 190 in which contextual information is provided for a displayed resource. As shown in FIG. 1B, a resource shown on the user device 110 may be a webpage including an article about good burger places where a portion of the article currently shown on the user device relates to the restaurant "Paul's Diner." In response to a request for contextual information, the user device 110 may receive resource recommendations of "Paul's Diner website" and "Burger Lover's website" and include a graphical panel including the resource recommendations shown on top of the underlying portion of the article currently shown on the user device that relates to the restaurant "Paul's Diner."

Figure 2:
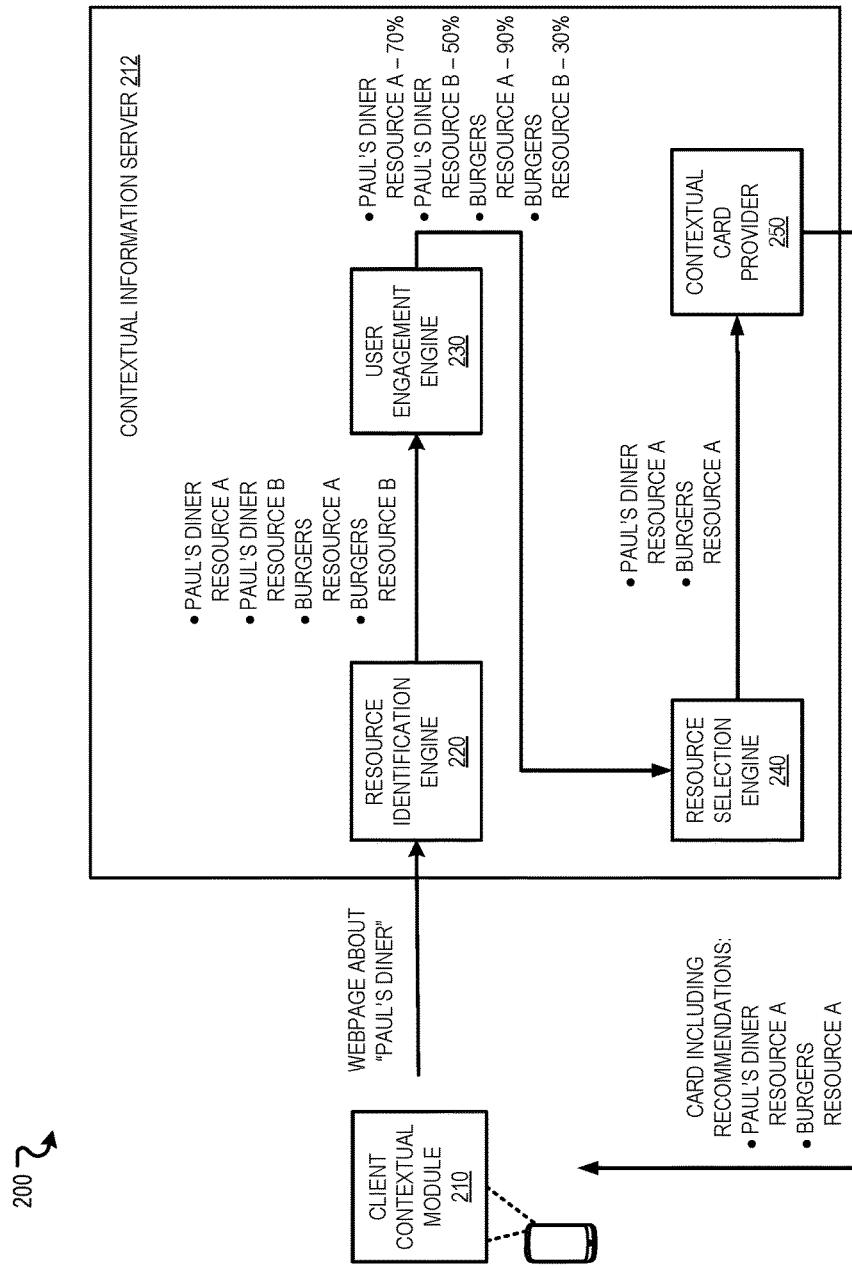
FIG. 2 is a block diagram of another example environment in which contextual information is provided for a displayed resource.

FIG. 2 is a block diagram of another example environment 200 in which contextual information is provided for a displayed resource. The environment 200 includes a client contextual module 210 on a user device and a contextual information server 212. The contextual information server 212 includes a resource identification engine 220, a user engagement engine 230, a resource selection engine 240, and a contextual card provider 250. In some implementations, the client contextual module 210 may be provided on the user device 110 shown in FIG. 1A. In other implementations, the client contextual module 210 may be provided on another user device different than the user device 110 shown in FIG. 1A. In some implementations, the contextual information server 212 may be the contextual information server 150 shown in FIG. 1A. In other implementations, contextual information server 212 may be different than the contextual information server 150 shown in FIG. 1A.

The client contextual module 210 determines that a user desires contextual information for a displayed resource. For example, the client contextual module 210 may determine that a user has rapidly pressed a button three times when viewing a webpage about the restaurant "Paul's Diner" (in this example, rapidly pressing the button three times indicates that the user desires contextual information). In response to determining that a user desires contextual information for a displayed resource, the client contextual module 210 generates a request to the contextual information server 212 for contextual information for the displayed resource. For example, the client contextual module 210 may generate a request to the contextual information server 212 for contextual information for the webpage about "Paul's Diner."

The client contextual module 210 may include information about the displayed resource in the request. For example, the client contextual module 210 may generate a screenshot that is an image showing the webpage and include the screenshot in the request. In another example, the client contextual module 210 by request that the operating system of the user device provide a tree based document object model that defines what is currently being rendered in an application that is in a foreground and include the model in the request. The document object model may define text that appears in the displayed resource and the appearance of the text, e.g., size, color, position, font, or other formatting, of the text.

In some implementations, the client contextual module 210 may include the information about the displayed resource in the request by determining a source of the displayed resource and including an indication of the source of the request. For example, the client contextual module 210 may determine that displayed resource is provided by a web browser application, in response, determine that the web browser application can provide a uniform resource locator (URL) for the displayed resource, and, in response, include an indication in the request that the source of the active resource is the web browser application and the URL for the displayed resource. Information may additionally or alternatively include metadata describing the displayed resource, a location of the user device, a portion not currently displayed of the resource, or an identity of the user. For example, the client contextual module 210 may determine that the user device 110 is located in Atlanta and include a location of "Atlanta" in the request.

The client contextual module 210 then provides the request to the resource identification engine 220 without the user entering a query. For example, the client contextual module 210 provides the request to the resource identification engine 220 in response to the user providing the indication that the user desires contextual information for the displayed resource, e.g., three rapid button presses, a long button press, or some other indication, without the user providing any further information, e.g., query terms, after providing the indication.

In response to providing the request to the resource identification engine 220, the client contextual module 210 receives a contextual card and renders the contextual card. For example, the client contextual module 210 receives a contextual card that includes navigation links to multiple resources about the restaurant "Paul's Diner" and one resource about the food "Burgers."

In operation, the contextual information server 212 identifies resources in response to the query independent request, and ranks the resources (either wholly or in part) based on measures of user engagement for the resource. A measure of user engagement quantifies how frequently users engage with a resource when the resource is identified to the user. In the example that follows, resources are identified from search entities determined from an active resource displayed on a user device, and then are ranked, in part, based on user engagement measures for the resources.

The resource identification engine 220 receives the request for contextual information for a displayed resource and identifies one or more resources that are relevant to the active resource. For example, the resource identification engine 220 may obtain a request that includes a screenshot of a webpage about the restaurant "Paul's Diner" and then identify two other resources about the restaurant "Paul's Diner" and two resources about the food "Burgers."

The resource identification engine 220 may use a variety of different processes to identifying resources. For example, the resource identification engine 220 may identify resources that are relevant to the active resource by identifying one or more search items from the content in the displayed resource and then identifying resources from the search items. For example, the resource identification engine 220 may obtain a request that includes a screenshot of webpage about "Paul's Diner," identify the restaurant "Paul's Diner" and the food "Burgers" as search items, and then identify resources that are related to the search items. In another example, the resource identification engine 220 may obtain a request that includes a document object model of webpage about "Paul's Diner," identify the restaurant "Paul's Diner" and the food "Burgers" as search items, and then identify resources that are related to the search items. As used in this specification, a "search item" is a concept or thing that can be used by a search system to conduct a search of information. A search item may be referred to by a text fragment, e.g., a term or phrase, and search items are distinguishable from one another, e.g., based on context. For example, a search item may be a keyword, and instance of a particular entity, a proper name, an entity or relation modeled by a node or an edge in a knowledge graph, and the like.

The resource identification engine 220 may identify the search items by extracting text from the request. For example, the resource identification engine 220 may extract the text "Paul's Diner is a restaurant that serves delicious burgers" from the request. The resource identification engine 220 may extract the text by performing image processing on the request. For example, the resource identification engine 220 may obtain a screenshot in the request and perform optical character recognition to identify the text "Paul's Diner is a restaurant that serves delicious burgers." The resource identification engine 220 may additionally or alternatively extract text by parsing a document object model included in the request. For example, the resource identification engine 220 may parse the model to identify the text "Paul's Diner is a restaurant that serves delicious burgers." In some implementations, the resource identification engine 220 may further determine an appearance of the text within the screenshot. For example, the resource identification engine 220 may determine one or more of size, color, font, position, or other formatting of text based on a screenshot or a document object model. In the case of images, the resource identification engine 220 may perform visual analysis of the image to identify text, objects, etc.

The resource identification engine 220 can, in some implementations, identify the more search items from the extracted text using an item knowledge graph. For example, the resource identification engine 220 may identify that the text "Paul's Diner" in the webpage matches the name of a restaurant "Paul's Diner" in an item knowledge graph and the text "Burger" in the webpage matches the name of a food item "Burger" in the item knowledge graph. The item knowledge graph may be a knowledge graph that includes nodes for search items, edges that indicate relationships between the nodes, and contextual information describing the search items represented by the nodes.

Additionally or alternatively, the resource identification engine 220 may identify resources from the identified search items using search query logs. For example, the resource identification engine 220 may identify the restaurant "Paul's Diner," in response, analyze search query logs to identify popular queries about the restaurant "Paul's Diner," and then identify resources that are responsive to the popular queries. Alternatively, the entity "Paul's Diner" may be used as a query itself to identify resources. In another example, the resource identification engine 220 may identify the restaurant "Paul's Diner" and, in response, analyze search query logs to identify queries about the restaurant "Paul's Diner," and then identify resources are most frequently responsive to the queries about the restaurant. Additionally or alternatively, the resource identification engine 220 may identify resources that are relevant to the active resource based on a source of the active resource.

For example, the resource identification engine may determine that the request includes an indication that the source of the active resource is a webpage with a particular URL and, in response, identify other resources that are frequently viewed by users that view the webpage with the particular URL is viewed. The resource identification engine 220 may identify resources based on determining relevance scores for resources. The relevance scores for resources may reflect a degree of confidence that the resource will be of interest to a user viewing the active resource. For example, the resource identification engine 220 may determine a relevance score of 95% for a home page of a website for the restaurant "Paul's Diner" when the active resource is an article about the restaurant "Paul's Diner" and a relevance score of 75% for an article about the food "Burgers" when the active resource is an article about the restaurant "Paul's Diner" that includes the text "burgers." The resource identification engine 220 may identify resources that satisfy a relevance threshold. For example, the resource identification engine 220 may identify resources where a relevance score is above 75%, 85%, 90%, or some other threshold.

The user engagement engine 230 receives data describing the identified resources from the identification engine 220 and determine a measure of user engagement for each of the resources. The measure of user engagement for a resource may reflect engagement of the resource by one or more users. For example, a trending webpage that is frequently viewed may have a greater engagement than an unpopular webpage that is not frequently viewed. In a particular example, the user engagement engine 230 may receive an indication that "Paul's Diner Resource A," "Paul's Diner Resource B," "Burgers Resource A," and "Burgers Resource B" were identified by the resource identification engine 220, determine a measure of user engagement of 70% for "Paul's Diner Resource A" that indicates that users engage with the resource at a high rate, determine a measure of user engagement of 50% for "PAUL'S DINER Resource B" that indicates that users engage with the resource at a moderate rate, determine a measure of user engagement of 90% for "Burger Resource A" that indicates that users engage with the resource at a high rate, and determine a measure of user engagement of 30% for "Burger Resource B" that indicates that users engage with the resource at a low rate.

The user engagement engine 230 may determine the measures of engagement for resources based on logs that represent requests for the resource. For example, the user engagement engine 230 may receive an identification of "Paul's Diner Resource A," determine from the log the number of times that "Paul's Diner Resource A" has been accessed in the last day, week, month, or some other time period, and determine a measure of user engagement of 70% based on the number. In some implementations, the logs may include one or more of search query logs that indicate resources that are requested using navigation links provided in search results page or application logs that indicate requests for resources that are provided by the applications, e.g., a web browser application, a video playing application, or some other application.

Another measure of user engagement that can be used is co-occurrence with the active resource. For example, assume that of the four resources "Paul's Diner Resource A," "Paul's Diner Resource B," "Burgers Resource A," and "Burgers Resource B", assume that for the active resource on the user device, "Paul's Diner Resource B," is most often selected next relative to the resources of "Paul's Diner Resource A," "Burgers Resource A," and "Burgers Resource B." In this situation, "Paul's Diner Resource B," would have the highest measure of user engagement.

Other types of user engagement can also be used to select resources.

The resource selection engine 240 may obtain the measures of user engagement for the multiple resources and select one or more resources to recommend to the user. For example, the resource selection engine 240 may receive an identification of "Paul's Diner Resource A" labeled with a measure of user engagement of 70%, "Paul's Diner Resource B" labeled with a measure of user engagement of 50%, "Burgers Resource A" labeled with a measure of user engagement of 90%, and "Burgers Resource B" labeled with a measure of user engagement of 30% and, in response, select to provide a recommendation for "Paul's Diner Resource A," "Paul's Diner Resource B," and "Burgers Resource A," and not select "Burgers Resource B" to provide a recommendation.

The resource selection engine 240 may select the resources based on determining whether the resources have respective measures of engagement that satisfy an engagement threshold. For example, the resource selection engine 240 may select the "Paul's Diner Resource A" as the measure of user engagement of 70% is greater than an engagement threshold of 50%, 55%, 65%, or some other percentage less than 70%. In another example, the resource selection engine 240 may not select the "Burgers Resource B" as the measure of user engagement of 30% is lower than an engagement threshold of 50%, 55%, 65%, or some other percentage above 30%.

In some implementations, the resource selection engine 240 may additionally or alternatively select the resources based on a maximum number. For example, the resource selection engine 240 may select a maximum of one, two, four, or some other resources and select the maximum number of resources with measures of user engagement that reflect the greatest degree of engagement. In some implementations, the resource selection engine 240 may additionally or alternatively select the resources based on a minimum. For example, the resource selection engine 240 may select a minimum of one, two, four, or some other resources with measures of user engagement that reflect the greatest degree of engagement.

In some implementations, the resource identification engine 220 may additionally select the search items based on the relevance scores determined by the resource identification engine 220. For example, the resource selection engine 240 may weigh the measures of user engagement for resources based on the relevance scores so that relevance scores for resources that reflect a lower degree of confidence weight the measures of user engagement corresponding to those resources to reflect a lower degree of engagement. Conversely, the resource selection engine 240 may weigh the measures of user engagement for resources based on the relevance scores so that relevance scores for resources that reflect a higher degree of confidence weight the measures of user engagement corresponding to those resources to reflect a higher degree of engagement. The resource identification engine 220 may increase a weight of the relevance scores on the measures of user engagement based on a source of the active resource. For example, the resource identification engine 220 may determine that the request includes an indication that the source of the active resource is a webpage from a particular website that provides content for entertainment purposes and, in response, determine that relevance is less important so decrease a weight of relevance scores on the measures of user engagement. In another example, the resource identification engine 220 may determine that the request includes an indication that the source of the active resource is a webpage from a particular website that focuses on providing education content and, in response, determine that relevance is more important so increase a weight of relevance scores on the measures of user engagement.

The contextual card provider 250 may obtain indicates of selected resources and provide a contextual card that includes navigation links to the selected resources to the client contextual module 210. For example, the contextual card provider 250 may obtain an identification of "Paul's Diner Resource A," "Paul's Diner Resource B," and "Burgers Resource A," in response, generate a contextual card that includes navigation links to "Paul's Diner Resource A," "Paul's Diner Resource B," and "Burgers Resource A," and provide the contextual card to the client contextual module 210.

Figure 3:
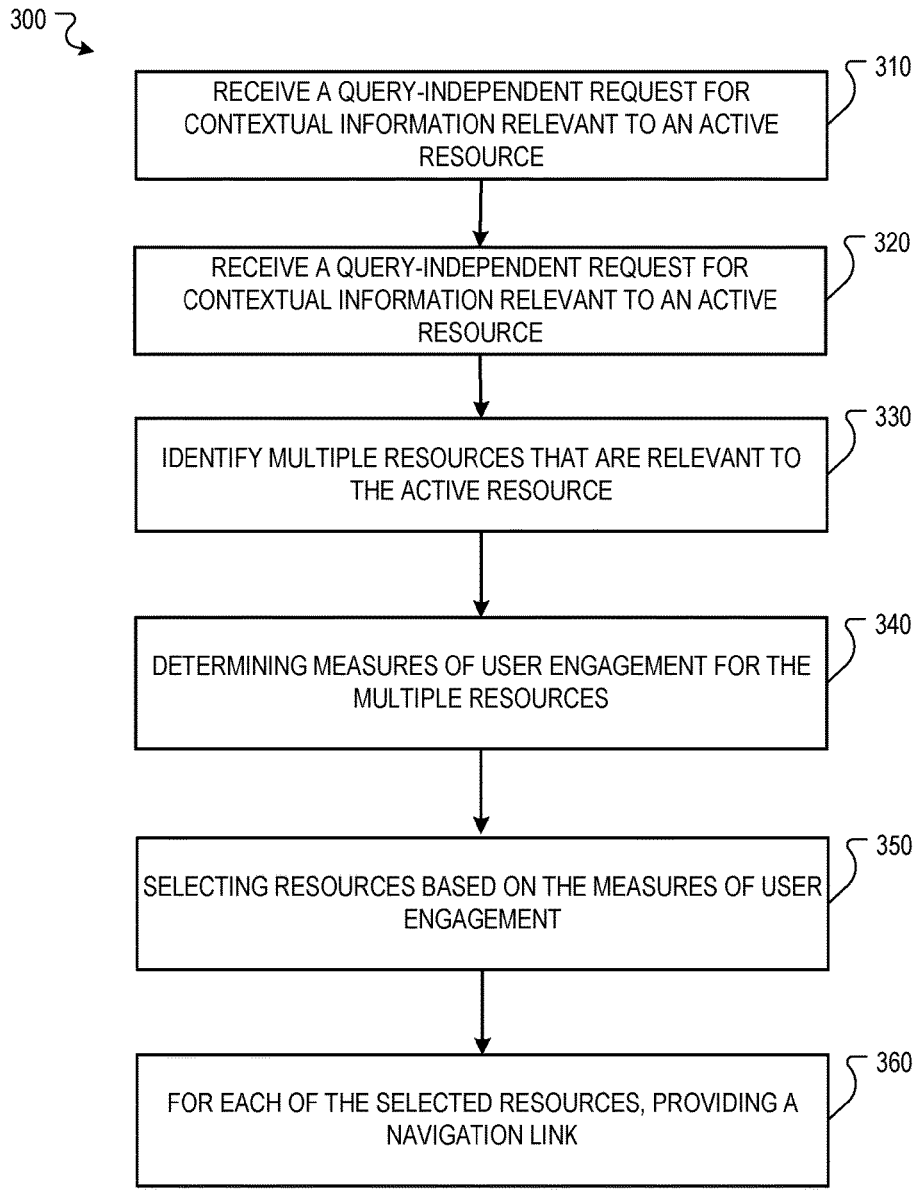
FIG. 3 is a flow diagram of an example process for providing contextual information for a displayed resource.

FIG. 3 is a flow diagram of a process 300 for providing contextual information for a displayed resource. For example, the process 300 can be used by the contextual information server 212 from the environment 200.

The process 300 includes receiving a query-independent request for contextual information relevant to an active resource (310). For example, the resource identification engine 220 may receive a request that includes a document object model that defines (i) text of a webpage of an article "Top Reasons to Visit San Francisco" and (ii) how the text is currently being displayed on a user device. In another example, the resource identification engine 220 may receive a request that includes a screenshot of a webpage being displayed on a user device.

The process 300 includes determining content described by the active resource in response to the query independent request (320). For example, the resource identification engine 220 may extract the text "San Francisco" from a screenshot in the request or extract text "San Francisco" from a document object model that represents at least a portion of a resource displayed.

The process 300 includes identifying multiple resources that are relevant to the content described by the active resource (330). For example, the resource identification engine 220 may identify the webpages "SF Wiki Article," "Top SF To-Do," "Golden Gate Website," and "San Francisco Rent." The multiple resources may be identified based on identifying search items from content in the active resource and then identifying the resources from the identified search items. For example, the resource identification engine 220 may extract the text "San Francisco" from a screenshot, determine that the text "San Francisco" corresponds to the city of "San Francisco" in a knowledge graph, identify resources that are responsive to search queries related to the city of "San Francisco." Additionally or alternatively, the multiple resources may be identified based on a source of the active resource. For example, the resource identification engine 220 may determine the request indicates that the active resource is being provided by a web browser application and includes a URL for the active resource and, in response, identify webpages that are frequently viewed by users that view the webpage with the URL.

The process 300 includes determining measures of user engagement for the multiple resources (340). For example, the user engagement engine 230 may receive identifications of the webpages "SF Wiki Article," "Top SF To-Do," "Golden Gate Website," and "San Francisco Tours" and determine that the webpage "SF Wiki Article" has a measure of user engagement of 90%, that the webpage "Top SF To-Do" has a measure of user engagement of 70%, that the webpage "Golden Gate Website" has a measure of user engagement of 60%, and that the webpage "San Francisco Tours" has a measure of user engagement of 40%. The measures of user engagement may be determined based on a number of times that the resources are requested. For example, the user engagement engine 230 may obtain a search query log that indicates that the webpage "SF Wiki Article" is clicked 90% of the time when it is provided in a search results listing and, in response, determine a corresponding measure of user engagement of 90%. In another example, the user engagement engine 230 may obtain a web browser log that indicates that the webpage "Top SF To-Do" was recently requested by many users and, in response, determine a corresponding high measure of user engagement of 70%.

The process 300 includes selecting resources based on the measures of user engagement (350). For example, the resource selection engine 240 may select the webpages "SF Wiki Article," "Top SF To-Do," and "Golden Gate Website," as the measures of user engagement for the webpages are above an engagement threshold of 50% and may not select the webpage "San Francisco Tours" as the measure of user engagement for the webpage is below an engagement threshold of 50%.

The process 300 includes, for each of the selected resources, providing a navigation link (360). For example, the contextual card provider 250 may generate a contextual card that includes a first navigation link to the webpage "SF Wiki Article," a second navigation link to the webpage "Top SF To-Do," and a third navigation link to the webpage "Golden Gate Website."

In some implementations, the process 300 can include additional steps, fewer steps, or some of the steps can be divided into multiple steps. For example, the contextual information server 212 may identify multiple resources that are relevant to the active resource based on measures of user engagement for the resources.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

Figure 4:
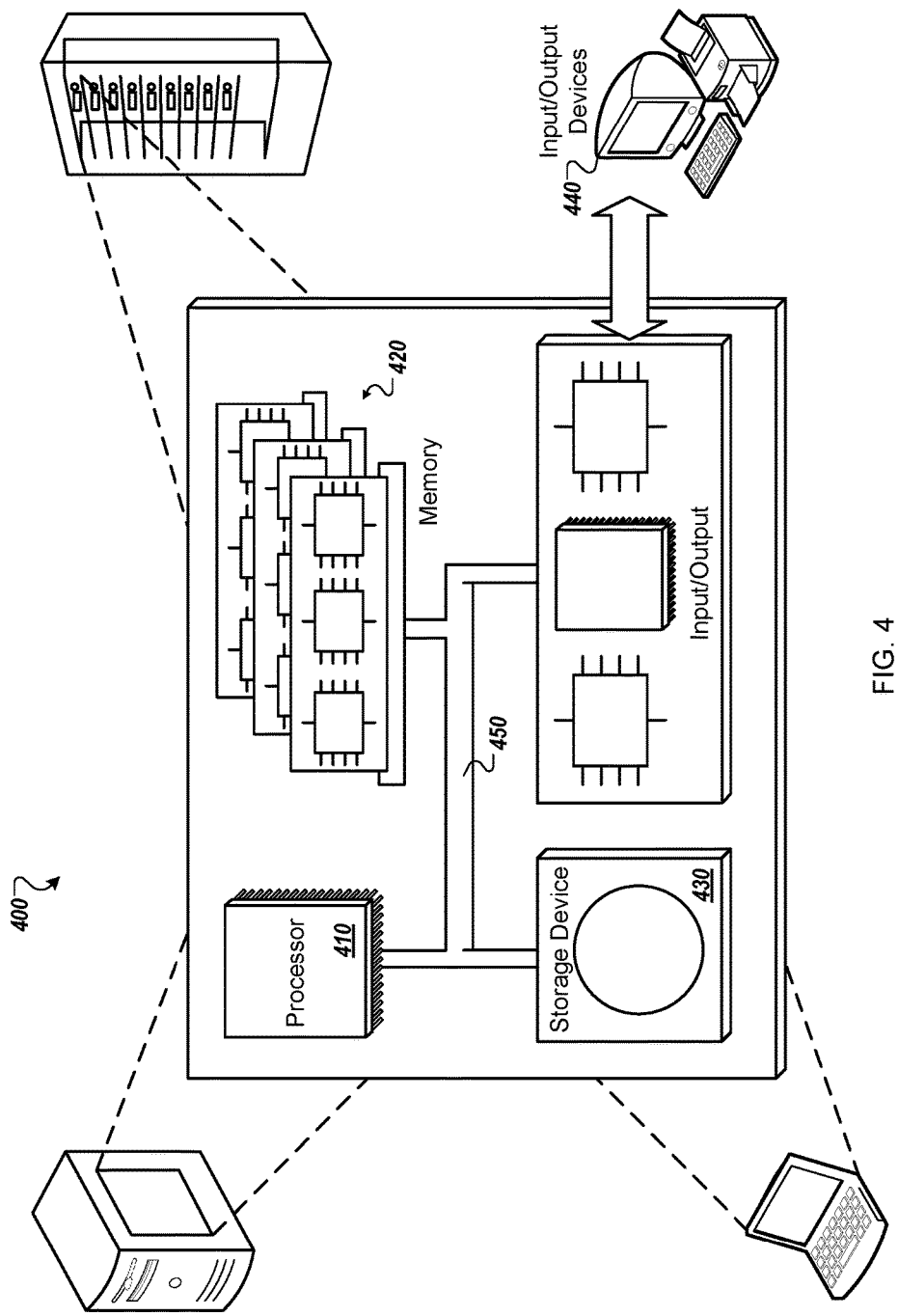
FIG. 4 is a schematic diagram of a computer system.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented in a data processing apparatus, the method comprising:
    receiving, from a user device, a query-independent request for contextual information relevant to an active resource displayed in an application environment on the user device, wherein the query-independent request is a request that does not include query parameters entered by the user;
    determining content described by the active resource in response to the query independent request;
    identifying, in response to the query-independent request, multiple resources that are relevant to the content described by the active resource;
    for each resource of the multiple resources, determining a corresponding measure of user engagement that reflects engagement of the resource by one or more users;
    selecting one or more of the multiple resources based on the measures of user engagement for the multiple resources; and
    providing, to the user device, a user interface element for display with the active resource, wherein the user interface element includes navigation links for each of the selected multiple resources that, upon selection, causes the user device to request the respective resource.

2. The method of claim 1, wherein identifying, in response to the query-independent request, multiple resources that are relevant to the content described by the active resource comprises:
    identifying multiple search items from the content described by the active resource; and
    identifying multiple resources that are relevant to the multiple search items as the multiple resources that are relevant to the active resource.

3. The method of claim 1, wherein identifying, in response to the query-independent request, multiple resources that are relevant to the content described by the active resource comprises:
    identifying multiple resources that are frequently viewed by users who view the active resource as the multiple resources that are relevant to the active resource.

4. The method of claim 3, wherein identifying, in response to the query-independent request, multiple resources that are relevant to the content described by the active resource comprises:
    determining a source of the active resource; and
    selecting one or more of the multiple resources based at least on the measures of user engagement, measures of relevance of the multiple resources to search items identified from the content in the active resource, and the source of the active resource.

5. The method of claim 1, wherein for each resource of the multiple resources, determining a corresponding measure of user engagement that reflects engagement of the resource by one or more users comprises:
    determining the corresponding measure of user engagement based on a number times that the resource is requested.

6. The method of claim 1, wherein selecting one or more of the multiple resources based on the measures of user engagement for the multiple resources comprises:
    selecting one or more of the multiple resources based at least on the measures of user engagement and relevance scores of the multiple resources identified from content in the active resource.

7. The method of claim 1, wherein the resource comprises one or more of a web page, an application page, or a textual conversation.

8. The method of claim 1, wherein the measure of user engagement is based, at least in part, on how frequently the one or more users engage with the resource when the resource is identified to the one or more users.

9. A system comprising:
    a data processing apparatus; and
    a non-transitory computer readable storage medium in data communication with the data processing apparatus and storing instructions executable by the data processing apparatus and upon such execution cause the data processing apparatus to perform operations comprising:
    receiving, from a user device, a query-independent request for contextual information relevant to an active resource displayed in an application environment on the user device, wherein the query-independent request is a request that does not include query parameters entered by the user;

determining content described by the active resource in response to the query independent request;

identifying, in response to the query-independent request, multiple resources that are relevant to the content described by the active resource;

for each resource of the multiple resources, determining a corresponding measure of user engagement that reflects engagement of the resource by one or more users;

selecting one or more of the multiple resources based on the measures of user engagement for the multiple resources; and providing, to the user device, a user interface element for display with the active resource, wherein the user interface element includes navigation links for each of the selected multiple resources that, upon selection, causes the user device to request the respective resource.

10. The system of claim 9, wherein identifying, in response to the query-independent request, multiple resources that are relevant to the content described by the active resource comprises:

identifying multiple search items from the content described by the active resource; and identifying multiple resources that are relevant to the multiple search items as the multiple resources that are relevant to the active resource.

11. The system of claim 9, wherein identifying, in response to the query-independent request, multiple resources that are relevant to the content described by the active resource comprises:

identifying multiple resources that are frequently viewed by users who view the active resource as the multiple resources that are relevant to the active resource.

12. The system of claim 11, wherein identifying, in response to the query-independent request, multiple resources that are relevant to the content described by the active resource comprises:

determining a source of the active resource; and selecting one or more of the multiple resources based at least on the measures of user engagement, measures of relevance of the multiple resources to search items identified from the content in the active resource, and the source of the active resource.

13. The system of claim 9, wherein for each resource of the multiple resources, determining a corresponding measure of user engagement that reflects engagement of the resource by one or more users comprises:

determining the corresponding measure of user engagement based on a number times that the resource is requested.

14. The system of claim 9, wherein selecting one or more of the multiple resources based on the measures of user engagement for the multiple resources comprises:

selecting one or more of the multiple resources based at least on the measures of user engagement and relevance scores of the multiple resources identified from content in the active resource.

15. The system of claim 9, wherein the resource comprises one or more of a web page, an application page, or a textual conversation.

16. The system of claim 9, wherein the measure of user engagement is based, at least in part, on how frequently the one or more users engage with the resource when the resource is identified to the one or more users.

17. A non-transitory computer readable storage medium storing instructions executable by a data processing apparatus and upon such execution cause the data processing apparatus to perform operations comprising:

receiving, from a user device, a query-independent request for contextual information relevant to an active resource displayed in an application environment on the user device, wherein the query-independent request is a request that does not include query parameters entered by the user;

determining content described by the active resource in response to the query independent request;

identifying, in response to the query-independent request, multiple resources that are relevant to the content described by the active resource;

for each resource of the multiple resources, determining a corresponding measure of user engagement that reflects engagement of the resource by one or more users;

selecting one or more of the multiple resources based on the measures of user engagement for the multiple resources; and providing, to the user device, a user interface element for display with the active resource, wherein the user interface element includes navigation links for each of the selected multiple resources that, upon selection, causes the user device to request the respective resource.

18. The medium of claim 17, wherein identifying, in response to the query-independent request, multiple resources that are relevant to the content described by the active resource comprises:

identifying multiple search items from the content described by the active resource; and identifying multiple resources that are relevant to the multiple search items as the multiple resources that are relevant to the active resource.

19. The medium of claim 17, wherein identifying, in response to the query-independent request, multiple resources that are relevant to the content described by the active resource comprises:

identifying multiple resources that are frequently viewed by users who view the active resource as the multiple resources that are relevant to the active resource.

20. The non-transitory computer readable storage medium of claim 17, wherein the measure of user engagement is based, at least in part, on how frequently the one or more users engage with the resource when the resource is identified to the one or more users.

* * * * *

UNITED STATES PATENT AND TRADEMARK OFFICE
CERTIFICATE OF CORRECTION

| | | |
|---|---|---|
| PATENT NO. | : 10,152,521 B2 | Page 1 of 1 |
| APPLICATION NO. | : 15/189523 | |
| DATED | : December 11, 2018 | |
| INVENTOR(S) | : Badr et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 206 days.

Signed and Sealed this
Thirtieth Day of July, 2019

Andrei Iancu
*Director of the United States Patent and Trademark Office*